United States Patent [19]

Liu et al.

[11] Patent Number: 5,696,940
[45] Date of Patent: Dec. 9, 1997

[54] APPARATUS AND METHOD FOR SHARING FIRST-IN FIRST-OUT MEMORY SPACE BETWEEN TWO STREAMS OF DATA

[75] Inventors: Andrew Liu, Portland; David Ellis, Hillsboro, both of Oreg.

[73] Assignee: Intel Corporation, Santa Clara, Calif.

[21] Appl. No.: 536,649

[22] Filed: Sep. 29, 1995

[51] Int. Cl.⁶ ............................................. G06F 13/00
[52] U.S. Cl. .................. 395/481; 395/436; 395/517; 395/518; 395/876; 395/877
[58] Field of Search .......................... 395/494, 497.01, 395/481, 483, 250, 436, 437, 164–66, 876, 877, 122, 507–518

[56] References Cited

U.S. PATENT DOCUMENTS

| | | | |
|---|---|---|---|
| 4,888,739 | 12/1989 | Frederick et al. | 365/221 |
| 4,891,788 | 1/1990 | Kreifels | 365/49 |
| 4,905,184 | 2/1990 | Giridhar et al. | 395/872 |
| 5,371,849 | 12/1994 | Peaslee et al. | 395/162 |
| 5,379,399 | 1/1995 | Conway-Jones et al. | 395/436 |
| 5,442,747 | 8/1995 | Chan et al. | 395/164 |
| 5,473,756 | 12/1995 | Traylor | 395/250 |
| 5,502,833 | 3/1996 | Byrn et al. | 395/459 |
| 5,537,552 | 7/1996 | Ogasawara et al. | 395/250 |

*Primary Examiner*—Tod R. Swann
*Assistant Examiner*—Conley B. King, Jr.
*Attorney, Agent, or Firm*—Blakely, Sokoloff, Taylor & Zafman

[57] ABSTRACT

A random access memory (RAM) device that allocates memory cells to first-in first-out (FIFO) memory. The RAM device has an array of addressable memory cells that are selected by row and column decoders. The memory cells and decoders have dual read and write lines that allow simultaneous read and write operations on the memory cells. The memory cells can store data from at least two data streams including, by way of example, a stream of U data and a stream of V data from an input device such as a YUV video processor. The RAM device includes a control circuit which generates separate read and write pointers for the U and V data. The control circuit also generates separate U and V minimum and almost full trigger pointers. Data is written into the memory cells until a write pointer reaches either a minimum trigger pointer or an almost full trigger pointer. When a write pointer exceeds a minimum or almost full trigger pointer, the control circuit requests that data be read from the memory cells so that morse data can be written into the memory cells. The minimum and almost full trigger pointers are programmable so that the memory space allocated to each data stream is dynamically variable.

9 Claims, 6 Drawing Sheets

APPARATUS AND METHOD FOR SHARING FIRST-IN FIRST-OUT MEMORY SPACE BETWEEN TWO STREAMS OF DATA

BACKGROUND OF THE INVENTION

1. Field of the Invention

The present invention relates to a memory device for a computer system.

2. Description of Related Art

A conventional computer system typically contains a central processing unit (CPU) that is connected to a main memory device(s) and one or more input/output (I/O) devices. The system may also have a direct memory access (DMA) controller that allows the I/O device to directly access the main memory. The I/O device may be a video camera or the port of a computer network that transceives data with the CPU and main memory.

Data provided to the computer system by the I/O device is typically first stored within a buffer memory device. The data is then transferred from the buffer to the main memory of the system. To increase the speed of the system, the buffer may be configured as a first-in first-out (FIFO) memory. FIFO memory organization is particularly useful when the I/O device is a video source which provides continuous streams of data.

FIFO buffer memory can be created by allocating a particular block of addressable memory cells within a random access memory (RAM) device. Conventional RAM devices typically contain blocks of memory larger than the space needed for one FIFO buffer. To fully utilize the RAM memory space, a number of FIFO buffers can be created within the memory device and connected to multiple data streams. The size of each FIFO buffer is fixed when the RAM device is manufactured. Having fixed FIFO memory allocations may result in an inefficient use of memory space, particularly if one data source transfers data at a higher rate than another data source. It would be desirable to provide a FIFO device that can dynamically vary the memory space allocated to different streams of data.

SUMMARY OF THE INVENTION

The present invention is a random access memory (RAM) device that allocates memory cells to first-in first-out (FIFO) memory. The RAM device has an array of addressable memory cells that are selected by row and column decoders. The memory cells and decoders have dual read and write lines that allow simultaneous read and write operations on the memory cells. The memory cells can store data from at least two data streams including, by way of example, a stream of U data and a stream of V data from an input device such as a YUV planar video processor. The RAM device includes a control circuit which generates separate read and write pointers for the U and V data. The control circuit also generates separate U and V minimum and almost full trigger pointers. Data is written into the memory cells until a write pointer reaches either a minimum trigger pointer or an almost full trigger pointer. When a write pointer exceeds a minimum or almost full trigger pointer, the control circuit requests that data be read from the memory cells so that more data can be written into the memory cells. The minimum and almost full trigger pointers are programmable so that the memory space allocated to each data stream is dynamically variable.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
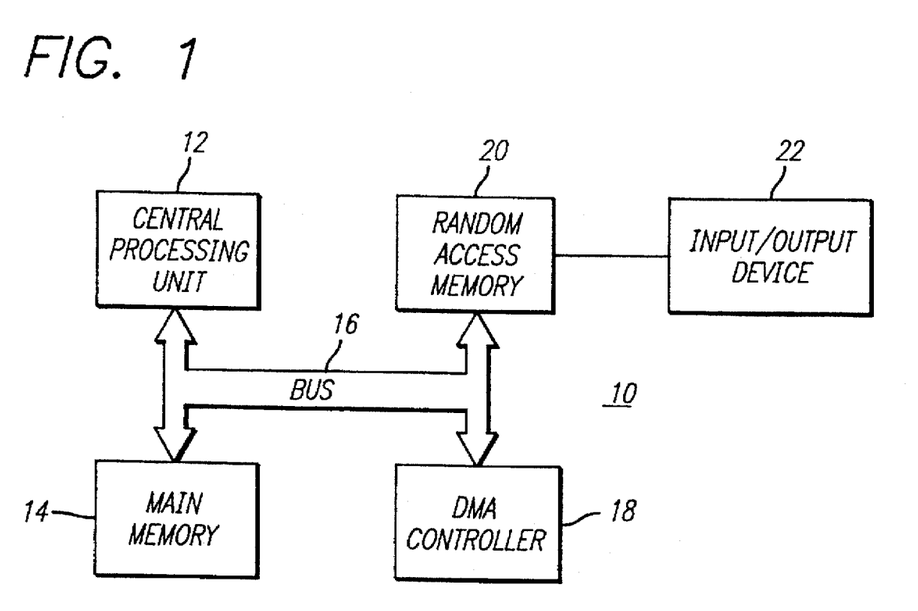
FIG. 1 is a schematic of a computer system.

Referring to the drawings more particularly by reference numbers, FIG. 1 shows a computer system 10. The system 10 typically contains a central processing unit (CPU) 12. The CPU 12 is connected to a main memory device(s) 14 by address/data bus 16. The system 10 may also have a direct memory access (DMA) controller 18 connected to the bus 16. The bus 16 allows address and data information to be transferred between devices. The "bus" 16 may also include control signals such as WR, RD, DMA, etc. It being understood that the bus may actually contain multiple busses and control lines used to operate the system.

The system 10 includes a random access memory (RAM) device 20 that is connected to the bus 16. The RAM device 20 may also be connected to an input/output (I/O) device 22. The I/O device 22 may be a video camera, video monitor, printer, network port, etc. In operation, the I/O device 22 transfers data to the RAM device 20. The RAM device 20 may function as a buffer and temporarily store the I/O data. The DMA controller 18 may then transfer the buffered data from the RAM device 20 to main memory 14 where the data can be retrieved by the CPU 12.

Figure 2:
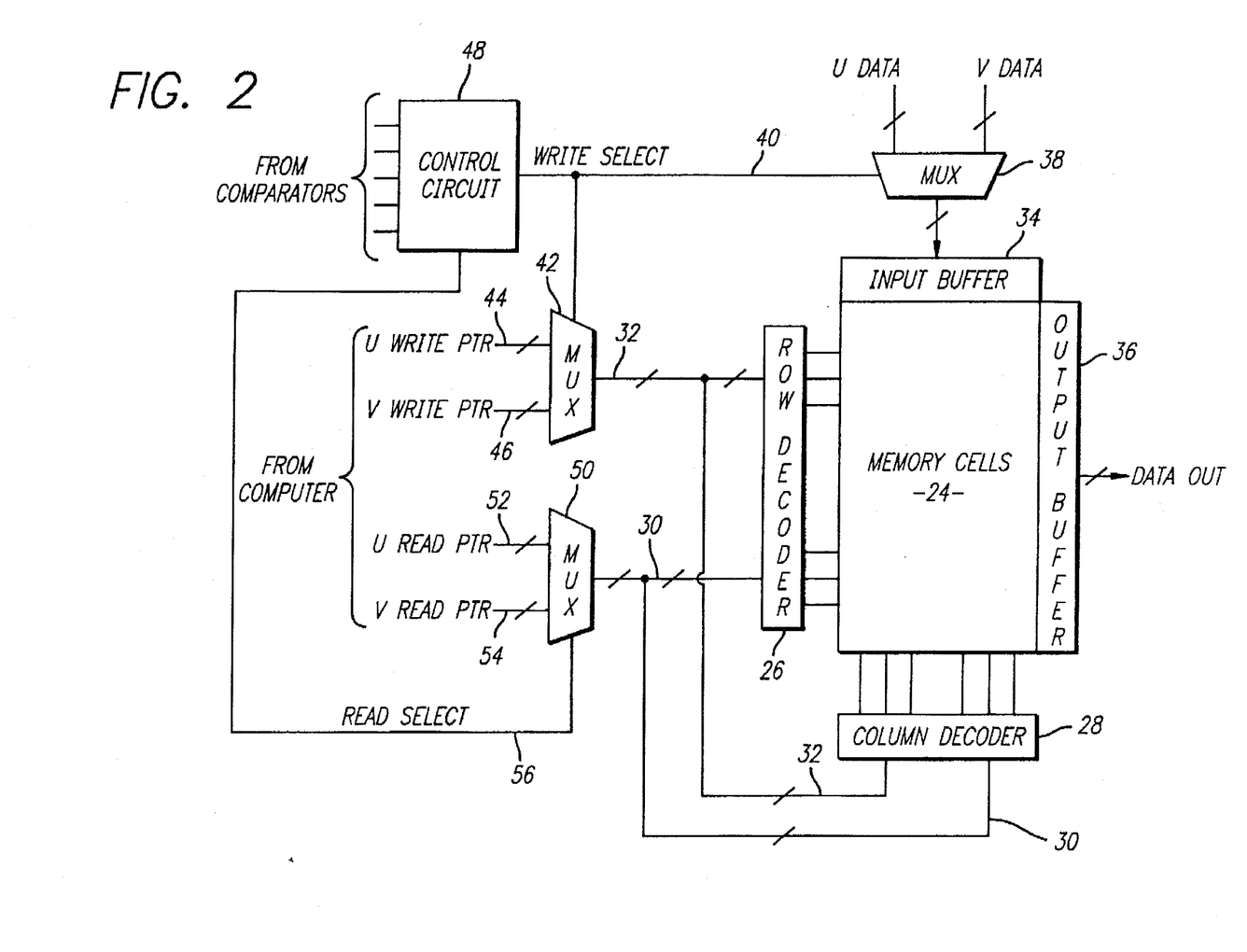
FIG. 2 is a schematic of a RAM device of the present invention.

FIG. 2 shows a preferred embodiment of the RAM device 20. The RAM 20 has an array of addressable memory cells 24 that are connected to a row decoder 26 and a column decoder 28. The RAM 20 is preferably a dual port device that has a plurality of read address input lines 30 connected to the row 26 and column 28 decoders and a plurality of write address input lines 32 connected to the decoders 26 and 28. The separate read 30 and write 32 lines allow data to be simultaneously written and read from the memory cells 24. The memory cells 24 may have input 34 and output 36 buffers to facilitate the writing and reading of data.

The RAM device 20 can receive U and V data from two different data sources. By way of example, the streams of data may be U and V data from a video processor that generates YUV planar data. Alternatively, the data may be the separate channels of an audio source. When used with a YUV video processor the RAM device can provide FIFO capability for both the U and V data. The Y data, which is typically generated at a higher rate than the U and V data, can be allocated to a separate FIFO RAM device. The prior art typically requires three separate FIFO RAM devices for the Y, U and V data, each device having fixed memory allocations. The present invention requires only two FIFO RAM devices which have dynamically variable memory allocations for each data stream Y, U or V. Although two data streams are shown and described, it is to be understood that the present invention may implement more than two streams of data.

The U and V data can be provided to the input buffer 34 of the memory cells 24 by a write data multiplexer (MUX) 38. The output of the MUX 38 is connected to the write data lines of the memory cells 24. The MUX 38 is controlled by a write select line 40. The write select line 40 also controls a write address multiplexer 42. The MUX 42 has a first input 44 which receives U write addresses that correlate to address locations within the memory cells in which the U data is to be written. The MUX 42 also has a second input 46 which receives V write addresses that correlate to address locations within the memory cells in which the V data is to be written. The output of the MUX 42 is connected to the row 26 and column 28 decoders. When U data is to be written into the memory cells 24, the write select line 40 is set to select U data on the output of MUX 38. The MUX 42 is selected to provide U addresses to the row 26 and column 28 decoders. V data can be written into the memory cells 24 by changing the state of the write select line 40. The state of the write select line 40 may be controlled by a control circuit 48.

The RAM device 20 may also include a read address multiplexer 50. The MUX 50 has a first input 52 which receives U read addresses which correlate to address locations within the memory cells from which U data is to be read, and a second input 54 which receives V read addresses that correlate to address locations within the memory cells from which V data is to be read. The MUX 50 is controlled by a read select line 56. Either U or V addresses are provided to the row 26 and column 28 decoders in accordance with the state of the read select line 56. The state of the read select line 56 may be controlled by control circuit 48.

Figure 3:
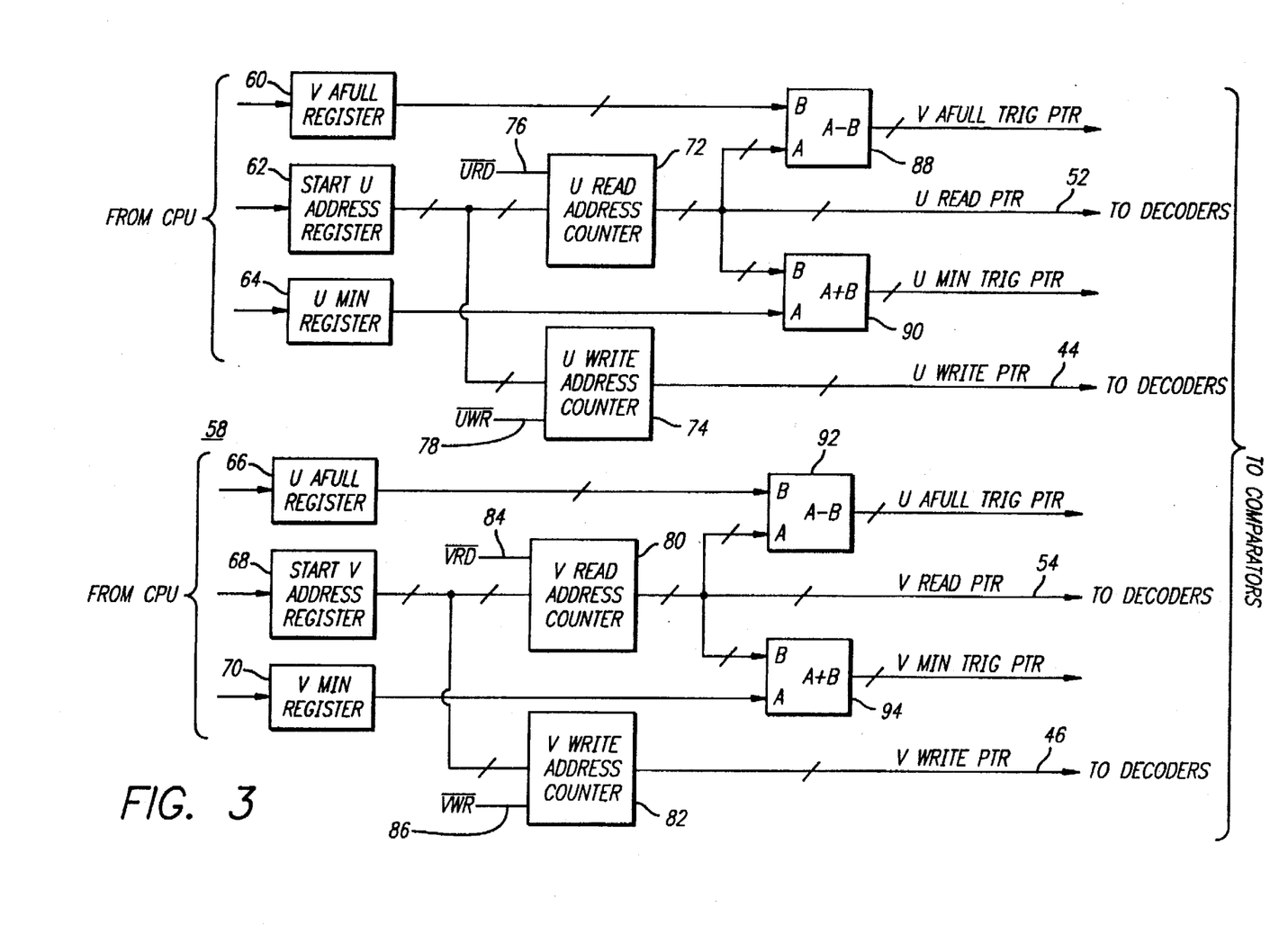
FIG. 3 is a schematic showing a counter circuit of the RAM device.

FIG. 3 shows a counter circuit 58 which generates the address inputs to the MUXes 42 and 50. The counter circuit 58 contains a V almost full register 60, a start U address register 62, a U minimum register 64, a U almost full register 66, a start V address register 68 and a V minimum register 70 which are all programmable by the CPU 12. The programmability of these registers allow the CPU 12 to dynamically vary the amount of memory allocated to the U and V data.

The U and V start address registers 62 and 68 contain the starting addresses for the U and V data that is subsequentially written into the memory cells 24. The output of the start U address register 62 is provided to a U read address counter 72 and a U write address counter 74. The counters 72 and 74 also receive as inputs U read (URD) and write (UWR) lines 76 and 78, respectively. The output of the read counter 72 is provided to MUX 50 on MUX input line 52. The output of the write counter 74 is provided to MUX 42 on input line 44. The output of the counters are also referred to as read and write pointers. The counters 72 and 74 increase the previous address one increment each time the lines 76 and 78 are driven active. For example, when the write line 78 is driven active for the first time, the output of the write counter 74 is incremented one address higher than the address provided by the start register 62. Likewise, when the read line 76 is driven active, the output of the read counter 72 is incremented one address higher than the previous address and so forth and so on.

The output of the start V address register 68 is provided to a V read address counter 80 and a V write address counter 82 which have V read and V write lines 84 and respectively. The V counters 80 and 82 also increment the V read and write pointers that are provided to MUXes 50 and 42, respectively.

The counter circuit 58 also includes a V almost full adder 88 which has inputs connected to the outputs of the V almost full register 60 and the U read address counter 72. The output of the adder 88 is an address which is the difference between the output of the counter 72 and a value stored within the register 60. The output of the adder 88 will be referred to as a V almost full trigger pointer. The output of the read counter and U minimum register 64 are provided to a U minimum adder 90. The output of the minimum adder 90 is an address which is the addition of the counter 72 and a value stored in the register 64. The output of the minimum adder 90 will be referred to as the U minimum trigger pointer.

The counter circuit 58 also has a U almost full adder 92 that provides a U almost full trigger pointer address that is the difference between the output of the V read counter 80 and the contents of the U almost full register 66, and a V minimum adder 94 that provides a V minimum trigger pointer address that is the summation of the counter 80 output and the contents of the V minimum register 70.

Figure 4:
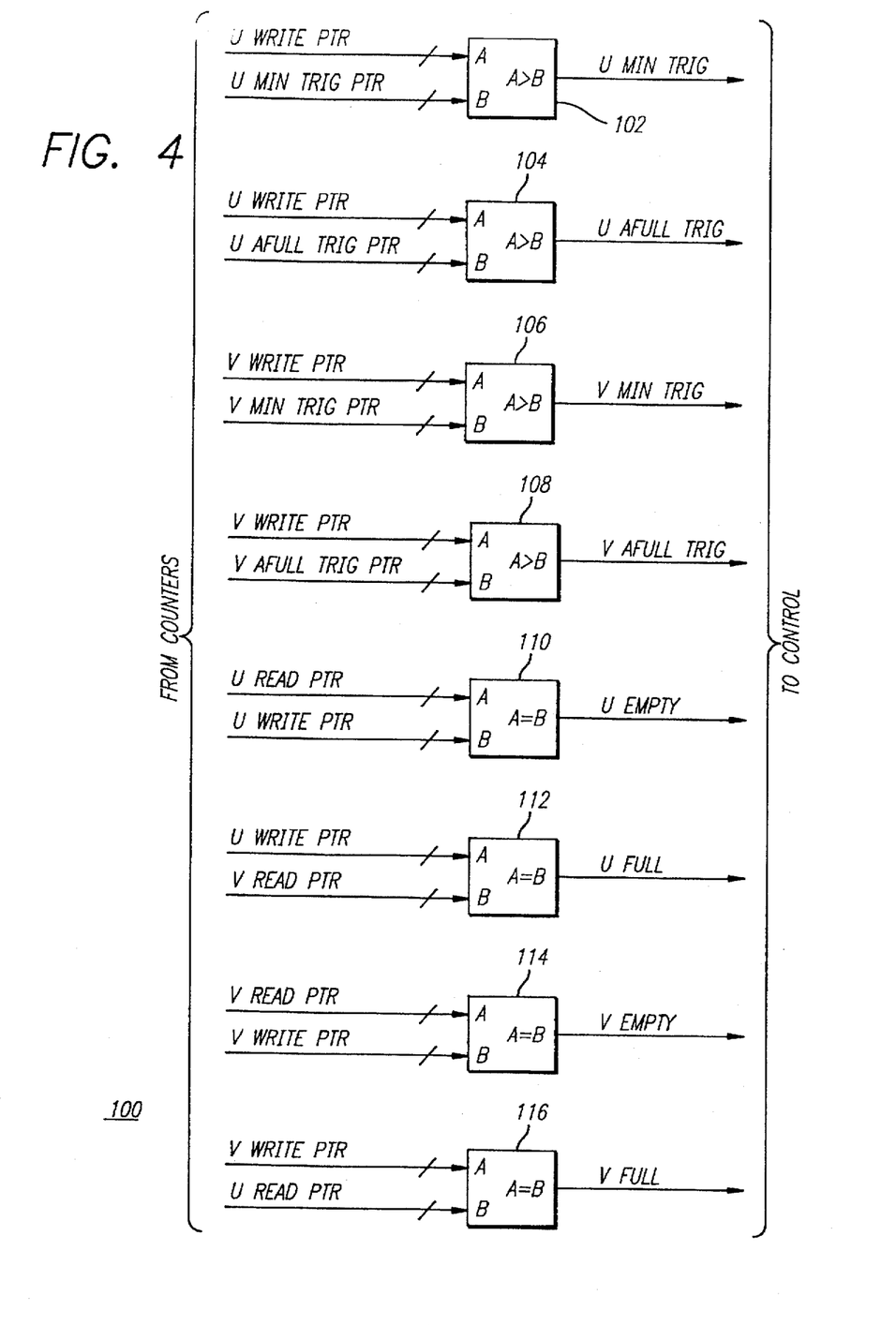
FIG. 4 is a schematic showing a comparator circuit of the RAM device.

As shown in FIG. 4, the outputs of the counter circuit 58 are provided to a comparator circuit 100. The outputs of the comparator circuit 100 are provided to the control circuit 48. The comparator circuit 100 includes a first comparator 102 which compares the U write pointer generated by U counter 74 with the U minimum trigger pointer generated by adder 90. The output of the comparator 102 is driven active if the write pointer exceeds than the minimum pointer. In response to an active comparator 102 output, the control circuit 48 will select the U read address input of MUX 50 through the read line 56. The output of the U read address counter 72 is provided to the row and column decoders so that memory cells 24 containing U data can be read through the output buffer 36.

The circuit 100 has a second comparator 104 which compares the U write pointer with the U almost full trigger pointer provided by adder 92. If the U write pointer is greater than the U almost full pointer, the control circuit 48 will select the V read address pointer of MUX 50 so that V data is read from the memory cells 24.

The third comparator 106 provides an active output when the V write pointer is greater than the V minimum trigger pointer provided by adder 94. The control circuit 48 selects MUX 50 so that V data is read from the memory cells 24 when this condition occurs. The fourth comparator 108 compares the V write pointer with the V almost full trigger pointer provided by adder 92. The control circuit 48 will select the MUX 50 so that U data is read from the memory cells 24 when the output of the comparator 108 is driven active.

The comparator circuit 100 may also have fifth 110, sixth 112, seventh 114 and eighth 116 comparators. The fifth and seventh comparators 110 and 114 provide active outputs when the U read pointer equals the U write pointer, and the V read pointer equals the V write pointer, respectively. The outputs of the comparators 110 and 114 are provided to corresponding registers (not shown) in the control circuit 48. The registers can be read by external devices such as the CPU 12 to determine whether the U or V queues are empty. Likewise, the sixth 112 and eighth 116 comparators provide active outputs when the U write pointer equals the V read pointer, and the V write pointer equals the U read pointer, respectively. These outputs are loaded into corresponding registers (not shown) of the control circuit 48 to provide an indication that the U and V queues are full.

Figure 5:
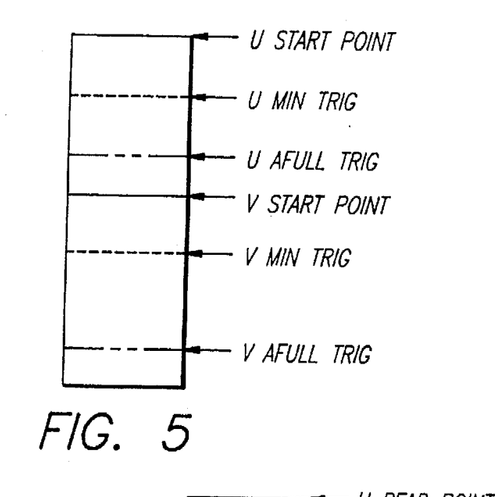
FIG. 5 is a schematic showing an empty FIFO queue.

FIG. 5 shows a FIFO queue which has U and V, read, write, minimum and almost full pointers. Each pointer points to a corresponding memory address of the memory cells. The address locations of the pointers are initially defined by the values within the registers 60–70. By way of example, the address of the V almost full trigger pointer is defined by the output of adder 88. The adder 88 output is the difference between the output of the U read counter 72, which initially is the address within the start U address register 62, and the value of the V almost full register 60. Likewise, the address of the V minimum trigger pointer is determined by the summation of the start V address register 68 and the V minimum register 70. The registers 60–70 are programmable so that the address locations of the various pointers can be varied. The minimum pointers should be separated from the corresponding read pointers so that enough data is available for an efficient data transfer when the queue is being emptied. The almost full triggers should be separated from the read pointers of the other data set so that there is enough space to cover any latency that occurs when switching between data streams.

Figure 5A:
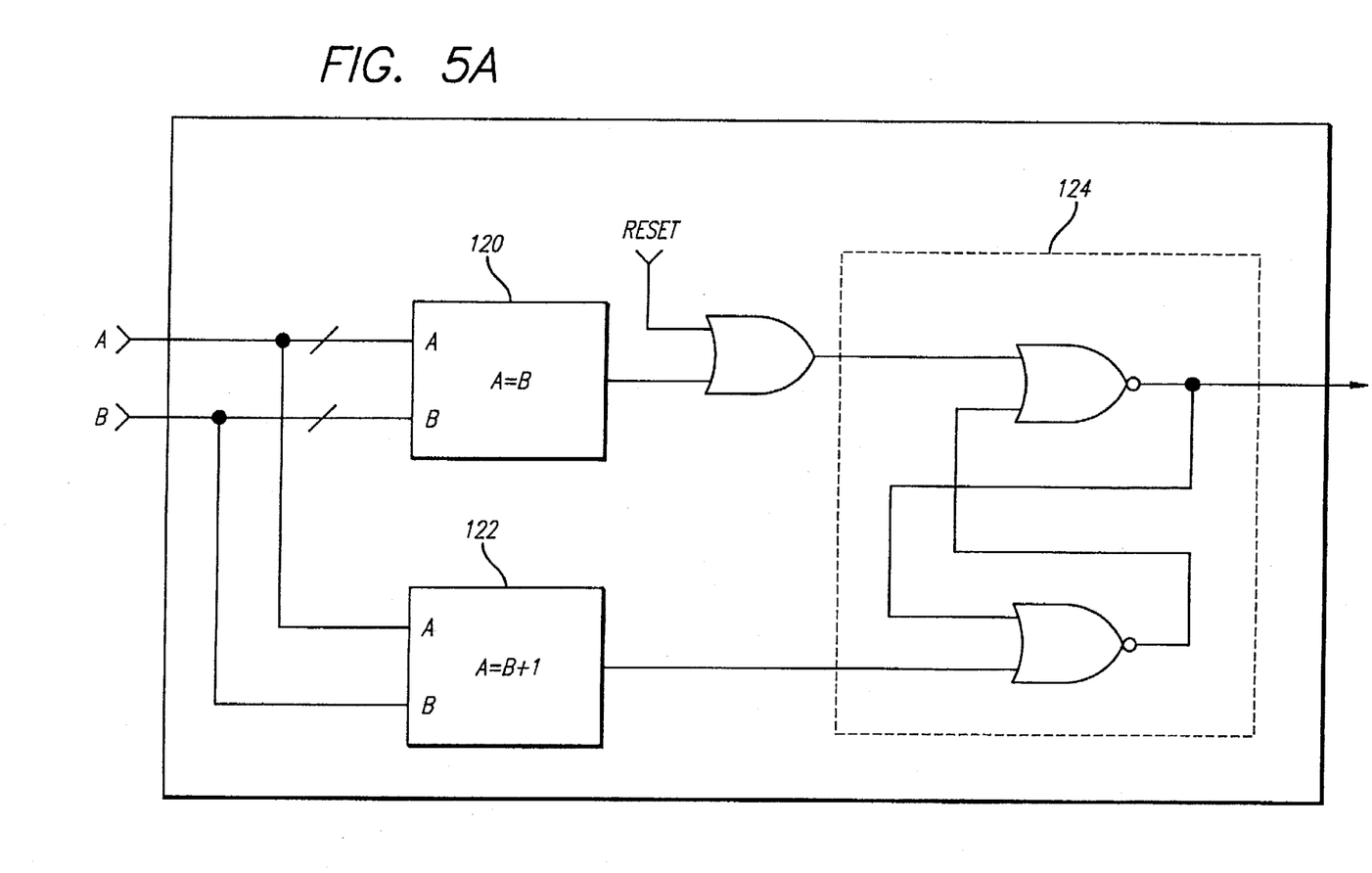
FIG. 5a is a schematic of a comparator.

FIG. 5a is a schematic of a preferred embodiment of the comparators 102–108. Each comparator circuit 102–108 contains a first comparator 120 that generates an active output signal when input A is equal to input B. The A input is the U or V write pointers. The B input is the almost full or minimum triggers. The circuits 102–108 also contain a second comparator 122 that generates an active output signal when A is equal to the input B+1 (A>B). The output signals of the comparators 120 and 122 are provided to an S-R latch 124. When the A input exceeds B, the latch 124 is set. When the A input is equal to the B input, the latch 124 is reset. The output of the first comparator 120 is ORed with a system reset signal by OR gate 126 to reset the latch when the device 20 is initialized. This comparator circuit insures that there is a correct comparison even when the write pointer loops to the top of the queue and the almost full or minimum triggers are still at the bottom of the queue.

Figure 6:
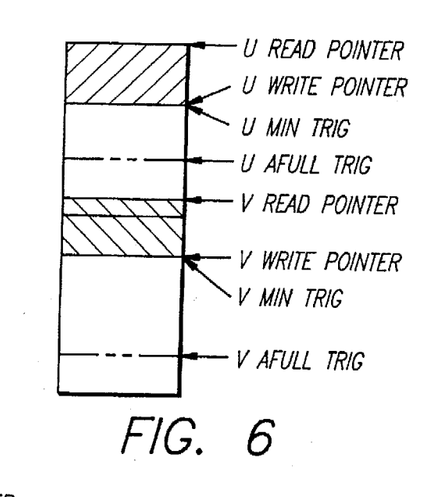
FIG. 6 is a schematic showing the FIFO queue being filled with U and V data.

As shown in FIG. 6, as data is written into the memory cells 24, the write counters 74 and 82 are incremented and the U and V write pointers move along the queue. When a U or V write pointer exceeds a corresponding U or V minimum trigger pointer, the comparators provide an output to the control circuit 48 which then selects the read MUX 50 so that data can be read from the memory cells 24. By way of example, the U write pointer may initially exceed the U minimum trigger pointer. The control circuit 48 will then select the MUX 50 so that the U read pointer address of counter 72 is provided to the decoders 26 and 28 to allow U data to be read from the memory cells.

Figure 7:
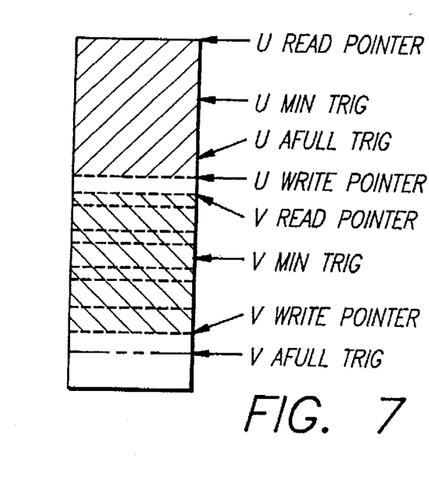
FIG. 7 is a schematic showing the FIFO queue filled with U and V data.

As shown in FIG. 7, the bus 16 of the system 10 may not accept data, wherein the memory cells continue to write data past the minimum trigger pointers. When a write pointer exceeds the almost full trigger, the control circuit 48 selects the MUX 50 so that data of the opposite data set can be read from the memory cells 24. For example, the U write pointer may exceed the U almost full trigger pointer before the V write pointer exceeds the V almost full trigger pointer, indicating that U data will eventually be written into a memory cell with valid V data.

Figure 8:
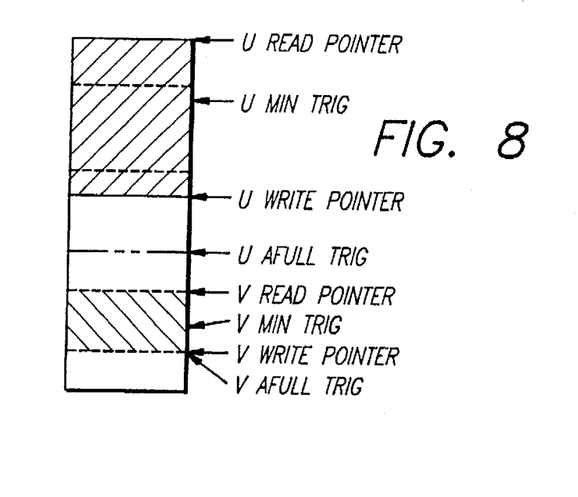
FIG. 8 is a schematic showing the FIFO queue with V data being read from the RAM device.

As shown in FIG. 8, when the U write pointer exceeds the U almost full trigger pointer, the MUX 50 is selected so that V data is read from the memory cells 24. The reading of V data changes the output of the read counter 80 and moves the V read pointer. The reading of V data also moves the V minimum trigger pointer and the U almost full trigger pointer through adders 92 and 94. The RAM device continues to write U and V data into the memory cells 24 even while data is being read from the device 20. When the V write pointer exceeds the V almost full trigger, indicating that the V data is coming to close to the U data, the output of comparator 108 is driven active so that the control circuit 48 allows U data to be read from the memory cells 24. Reading U data moves the U read pointer, the U minimum trigger pointer and the V almost full trigger pointer.

Figure 9:
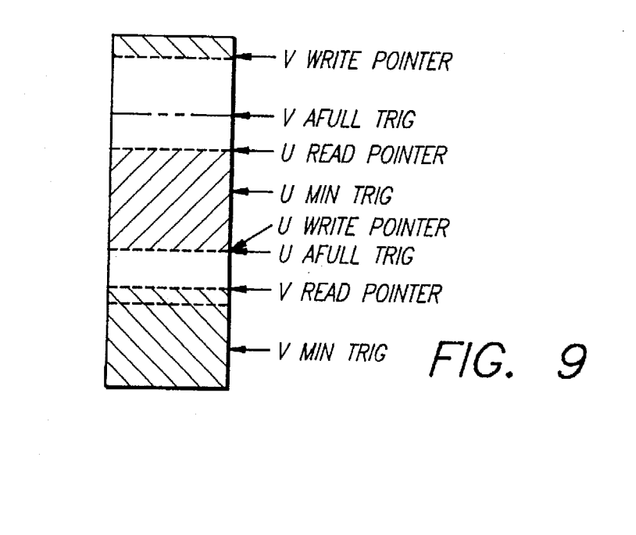
FIG. 9 is a schematic showing the FIFO queue with U data being read from the RAM device.

As shown in FIG. 9, the control circuit 48 selects the MUX 50 so that V data is subsequently read from the memory cells until either the U data queue becomes empty, as indicated by an active output from comparator 110, or the U write pointer exceeds the U almost full trigger pointer and the V write pointer is less than the V almost full trigger the V write pointer is less than the V almost full trigger pointer as indicated by an active output from comparator 102 and an inactive output from comparator 108.

The process proceeds so that data is continuously written and read from the memory cells. The control circuit 48 preferably contains logic which has a hierarchy that initially reads data of the opposite data set if a write pointer exceeds an almost full trigger pointer (V data is read if the U write pointer exceeds the U almost full trigger pointer, or U data is read if the V write pointer exceeds the V almost full trigger pointer). If a write pointer does not exceed an almost full trigger, the control circuit will then select the MUX 50 to read a data set which has a write pointer that exceeds a minimum trigger pointer (U data read when the U write pointer exceeds the U minimum trigger pointer, or V data is read when the V write pointer exceeds the V minimum trigger pointer). The data set with the smallest memory allocation receives the highest read priority.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Although a FIFO RAM device is shown and described as providing the function of an I/O buffer, it is to be understood that the present invention encompasses any use of the disclosed variable FIFO memory.

What is claimed is:

1. A first-in first-out memory device that stores two streams of data that includes a U data and a V data, comprising:

a first input data port that provides the U data;

a second input data port that provides the V data;

an array of addressable memory cells that are coupled to said first and second input data ports;

a decoder circuit that selects said memory cells to allow U and V data to be written to and read from said array of addressable memory cells;

a counter circuit which provides a U read pointer, a U write pointer, a V read pointer and a V write pointer that each provide an address to said decoder circuit to select said memory cells, said U and V read pointers are incremented each time U and V data is respectively read from said array of addressable memory cells, said U and V write pointers are incremented each time U and V data is respectively written into said array of addressable memory cells, said counter circuit further provides a U almost full trigger pointer that is separated from said V read pointer by a predetermined number of addresses, and a V almost full trigger pointer that is separated from said U read pointer by a predetermined number of addresses; and, a comparator/control circuit which selects said array of addressable memory cells to allow U data to be read from said array of addressable memory cells when said V write pointer exceeds said V almost full trigger pointer, and selects said array of addressable memory cells to allow V data to be read from said array of addressable memory cells when said U write pointer exceeds said U almost full trigger pointer.

2. The memory device as recited in claim 1, wherein said counter circuit further provides a U minimum trigger pointer and a V minimum trigger pointer, and said comparator/control circuit selects said array of addressable memory cells to allow U data to be read from said array of addressable memory cells when said U write pointer exceeds said U minimum trigger pointer, and selects said array of addressable memory cells to allow V data to be read from said array of addressable memory cells when said V write pointer exceeds said V minimum trigger pointer.

3. The memory device as recited in claim 2, wherein said comparator/control circuit generates a U empty signal when said U read pointer is equal to said U write pointer, a V empty signal when said V read pointer is equal to said V write pointer, a U full signal when said U write pointer equals said V read pointer, and a V full signal when said V write pointer equals said U read pointer.

4. A computer system, comprising:

an input device that provides a U data and a V data;

an array of addressable memory cells that are coupled to said input device;

a decoder circuit that selects said memory cells to allow U and V data to be written to and read from said array of addressable memory cells;

a counter circuit which provides a U read pointer, a U write pointer, a V read pointer and a V write pointer that each provide an address to said decoder circuit to select said memory cells, said U and V read pointers are incremented each time U and V data is respectively read from said array of addressable memory cells, said U and V write pointers are incremented each time U and V data is respectively written into said array of addressable memory cells, said counter circuit further provides a U almost full trigger pointer that is separated from said V read pointer by a predetermined number of addresses, and a V almost full trigger pointer that is separated from said U read pointer by a predetermined number of addresses;

a comparator/control circuit which selects said array of addressable memory cells to allow U data to be read from said array of addressable memory cells when said V write pointer exceeds said V almost full trigger pointer, and selects said array of addressable memory cells to allow V data to be read from said array of addressable memory cells when said U write pointer exceeds said U almost full trigger pointer;

a central processing unit that is coupled to said counter circuit;

a main memory device that is coupled to said array of addressable memory cells; and, a direct memory access controller that transfers the U and V data from said array of addressable memory cells to said main memory device.

5. The system as recited in claim 4, wherein said counter circuit further provides a U minimum trigger pointer and a V minimum trigger pointer, and said comparator/control circuit selects said array of addressable memory cells to allow U data to be read from said array of addressable memory cells when said U write pointer exceeds said U minimum trigger pointer, and selects said array of addressable memory cells to allow V data to be read from said array of addressable memory cells when said V write pointer exceeds said V minimum trigger pointer.

6. The system as recited in claim 5, wherein said comparator/control circuit generates a U empty signal when said U read pointer is equal to said U write pointer, a V empty signal when said V read pointer is equal to said V write pointer, a U full signal when said U write pointer equals said V read pointer, and a V full signal when said V write pointer equals said U read pointer.

7. A method for storing two data streams including a U data and a V data into a first-in first-out memory device, comprising the steps of:

a) generating a U read pointer, a V read pointer, a U write pointer, a V write pointer, a U almost full trigger pointer that is separated from said V read pointer by a predetermined number of addresses, and a V almost full trigger pointer that is separated from said U read pointer by a predetermined number of addresses;

b) writing a plurality of U data into an array of addressable memory cells, wherein said U write pointer is incremented each time U data is stored into said array of addressable memory cells;

c) writing a plurality of V data into an array of addressable memory cells, wherein said V write pointer is incremented each time V data is stored into said array of addressable memory cells; and, d) reading U data from said array of addressable memory cells when said V write pointer exceeds said V almost full trigger pointer.

8. The method as recited in claim 7, further comprising the step of reading V data from said array of addressable memory cells when said U write pointer exceeds said U almost full trigger pointer.

9. The method as recited in claim 7, further comprising the steps of generating a U minimum trigger pointer and a V minimum trigger pointer, reading U data from said array of addressable memory cells when said U write pointer exceeds said U minimum trigger pointer, and reading V data from said array of addressable memory cells when said V write pointer exceeds said V minimum trigger pointer.

* * * * *